(12) United States Patent
Canard et al.

(10) Patent No.: US 7,571,324 B2
(45) Date of Patent: Aug. 4, 2009

(54) METHOD AND DEVICE FOR ANONYMOUS SIGNATURE WITH A SHARED PRIVATE KEY

(75) Inventors: Sèbastien Canard, Caen (FR); Marc Girault, Caen (FR); Jacques Traore, Saint Georges des Groseillers (FR)

(73) Assignee: France Telecom, Paris (FR)

( * ) Notice: Subject to any disclaimer, the term of this patent is extended or adjusted under 35 U.S.C. 154(b) by 593 days.

(21) Appl. No.: 10/500,792

(22) PCT Filed: Dec. 13, 2002

(86) PCT No.: PCT/FR02/04335

§ 371 (c)(1),
(2), (4) Date: Mar. 21, 2005

(87) PCT Pub. No.: WO03/061193

PCT Pub. Date: Jul. 24, 2003

(65) Prior Publication Data

US 2005/0169461 A1 Aug. 4, 2005

(30) Foreign Application Priority Data

Jan. 4, 2002 (FR) .................................. 02 00107

(51) Int. Cl.
*H04K 1/00* (2006.01)
*H04L 9/00* (2006.01)
*H04L 9/28* (2006.01)
*G06F 7/04* (2006.01)
*G06K 9/00* (2006.01)

(52) U.S. Cl. .............. 713/180; 713/156; 713/163; 713/170; 726/4; 726/5; 726/6; 380/28

(58) Field of Classification Search ................ 713/180, 713/163
See application file for complete search history.

(56) References Cited

U.S. PATENT DOCUMENTS 6,298,153 B1 * 10/2001 Oishi .......................... 382/186
6,748,530 B1 *  6/2004 Aoki .......................... 713/156
6,986,044 B1 *  1/2006 Inada .......................... 713/170

OTHER PUBLICATIONS

Camenisch, Jan Leonhard, "Group Signature Schemes and Payment Systems Based on the Discrete Logarithm Problem," 1998, Swiss Federal Institute of Technology Zurich, Doctor of Technical Sciences Thesis., Diss. ETH No. 12520.*

Hyun-Jeong Kim et al., "Efficient and Secure Member Deletion in Group Signature Schemes," D.Won (ed): ICISC 2000, pp. 150-161; Springer-Verlag Berlin Heidelberg 2001.*

(Continued)

*Primary Examiner*—Matthew B Smithers
*Assistant Examiner*—Luu Pham
(74) *Attorney, Agent, or Firm*—Cohen Pontani Lieberman & Pavane LLP

(57) ABSTRACT

A cryptographic method and apparatus for anonymously signing a message. Added to the anonymous signature is another signature which is calculated (operation 13) using a private key common to all the members of a group authorized to sign and unknown to all revoked members. The private key is updated (operations 8, 11) at group level on each revocation within the group and at member level only on anonymous signing of a message by the member.

4 Claims, 3 Drawing Sheets

OTHER PUBLICATIONS

Chuan-Kun Wu et al., "Many-to-one Cryptographic Algorithms and Group Signature," Jan. 1999, University of Western Sydney; pp. 1-18.*

Tzong-Sun Wu et al., "Threshold Signature Scheme Using Self-Certificate Public Keys," Jan. 2002, National Taiwan University of Science and Technology; pp. 1-9.*

Jan Camenisch et al., "A Group Signature Scheme with Improved Efficiency", Advances in Cryptology—ASIACRYPT'98, LNCS vol. 1514, pp. 160-174, Springer-Verlag. 2000.

Jan Camenisch et al, "Efficient Group Signature Schemes for Large Groups", Advances in Cryptology—CRYPT097, vol. 1296 of LNCS, pp. 410-424, 1997.

Chung Kei Wong et al., Secure Group Communications Using Key Graphs, Technical Report TR-97-23, pp. 1-27, Jul. 28, 1997.

H.J. Kim et al., "Efficient and Secure Member Deletion in Group Signature Schemes", ICISC 2000—LNCS vol. 2015, pp. 150-161, Springer-Verlag 2000.

E. Bresson et al.., "Efficient Revocation in Group Signatures", Public Key Cryptography PKC 2001, vol. 1992 of LNCS, pp. 190-206, Springer-Verlag, 2001.

Petersen, Holger, "How to Convert any Digital Signature Scheme into a Group Signature Scheme", LNCS 1361, pp. 178-190.

* cited by examiner

METHOD AND DEVICE FOR ANONYMOUS SIGNATURE WITH A SHARED PRIVATE KEY

This is a U.S. national stage of International Application No. PCT/FR02/04335, filed on 13 Dec. 2002.

FIELD OF THE INVENTION

The present invention relates to the field of telecommunications and more particularly to securing transmissions, in particular for services, using cryptography.

BACKGROUND OF THE INVENTION

Electronic signature mechanisms have been developed for authenticating the source of a document transmitted via telecommunications means. It should be noted that the term "transmission in electronic form" is routinely used to refer to the transmission of a document via telecommunications means. In the context of the invention, the documents in question are necessarily in digital form, as opposed to paper form; the term "message" as used below in this application refers to this type of document. The most widely used electronic signature mechanisms are based on public key cryptographic techniques that rely on an entity known as a trusted authority. The trusted authority usually generates certificates on behalf of users of standard public key methods; these certificates establish a connection between a public key and the identity of the proprietor of the key. To use this kind of method, the persons signing messages must first obtain certification from the trusted authority by communicating thereto at least their public keys and their identities. The method calculates an electronic signature for a message taking account of the content of the message and of the person's private key. The signatory sends the message, the signature and the certificate to the addressee of the message, who verifies the electronic signature of the message using at least the public key and the content of the message.

For some applications, such as electronic voting, electronic bidding or anonymous electronic payments, it is necessary to use an anonymous electronic signature. An anonymous electronic signature has the same characteristics as an ordinary electronic signature except that the addressee cannot determine the identity of the signatory, who remains anonymous. However, the addressee is able to contact the trusted authority, which is able to remove the anonymity by referring to the certificate.

The anonymous group signature is one particular type of anonymous signature. An anonymous group signature scheme enables each member of a group to produce an electronic signature that is characteristic of the group. The addressee of a message accompanied by an anonymous group signature is able to verify that the signature was applied by one of the members of the group but is not able to determine which of the members of the group this was.

In the context of the invention, a group is a set of persons who declare themselves to an authority as belonging to the same group. At the time of this declaration, each person interacts with the trusted authority using a particular protocol, after which the person obtains a private key which is associated with a public key of the group previously determined by the trusted authority, and the authority and the person obtain an identifier of the person associated with the private key. Below, in this application, each person is referred to as a member. One example of a protocol of this kind is described in the paper by J. Camenisch and M. Michels "Efficient Group Signature Schemes For Large Groups", in B. Kaliski, editor, Advances In Cryptology—CRYPTO97, Volume 1296 of LNCS, pages 410 to 424, Springer-Verlag, 1997. The same interaction occurs upon the arrival of a new member. From the point of view of the trusted authority, the existence of a group is reflected by assigning the group a group public key and assigning each member a different private key associated with the public key and an identifier. Using his or her own private key, a member is able to apply an anonymous group signature to a selected message. Any addressee is able to verify that the signature was in fact applied by one of the members of the group, provided that the group public key was used. After verification, the addressee is certain either that the signature was applied by a member of the group or that it was not, as the case may be, but obtains no information as to the identifier of that member, the signatory communicating his or her own identifier to the addressee only in a form encrypted by means of a public key of the trusted authority; the signature is anonymous. However, the addressee may contact the trusted authority, which is able to determine the identity of the signatory from the encrypted identifier accompanying the group anonymous signature. Thus the trusted authority is able to remove the anonymity at any time.

A group may evolve after it has been set up by the trusted authority. A first type of change is for new persons to become members of the group. A second type of change, referred to as revocation, is for members to leave the group or to be excluded from the group. Each time the group changes, the trusted authority is faced with the problem of assigning to or withdrawing from a member of the group the means for applying a group anonymous signature. The first problem that arises relates to assigning a new member the means for applying a group anonymous signature, and is solved using one of the prior art public key/private key generation algorithms that associate as many private keys as necessary with the same public key. One example of this kind of algorithm is described in the paper by J. Camenisch and M. Michels "Efficient Group Signature Schemes For Large Groups", in B. Kaliski, editor, Advances In Cryptology—CRYPTO97, Volume 1296 of LNCS, pages 410 to 424, Springer-Verlag, 1997.

The second problem that arises relates to withdrawing these means from a person, and is solved by various prior art revocation methods.

A first of these methods is described in the paper by E. Bresson and J. Stern "Efficient Revocation In Group Signatures", in K. Kim, editor, Public Key Cryptography—PKC 2001, Volume 1992 of LNCS, pages 190-206, Springer-Verlag, 2001. That method is based on the fact that each member of a group has a personal identifier. Given that the signature must remain anonymous, it is not possible to reveal this identifier. However, in this method, the identifier of the signatory is divided by that of each revoked member; the result of each division is different from 1 if, and only if, the signatory is not a revoked member. Using an encryption algorithm, each of the results of these divisions is then encrypted and the encrypted result is sent to the addressee, accompanied by particular elements. The addressee uses the particular elements and the encrypted results to verify that the divisions have been effected correctly and that all the results are different from 1, which confirms that the signature was applied by a non-revoked member.

Given that there are as many encrypted results and particular elements as there are revoked members, this method has the drawback of generating a group anonymous signature whose length and calculation time increase in proportion to the number of revoked members.

A second revocation method is described in the paper by H. J. Kim, J. I. Lim and D. H. Lee "Efficient And Secure Member Deletion In Group Signature Schemes", in D. Won, editor, Information Security And Cryptology—ICISC 2000, Volume 2015 of LNCS, pages 150 et seq., Springer-Verlag, 2000. That method uses three keys in addition to the keys necessary for a successful group signature scheme, namely an ownership private key for each member, an ownership public key to enable members to verify the validity of their own keys, and a renewal public key to enable members to modify their ownership private keys each time that a member joins or leaves the group. The trusted authority modifies the ownership public key and the renewal key for each new member and for each revocation of a member. The remaining members of the group modify their ownership private keys using the renewal key and verifies validity by using the ownership public key. To sign a message electronically, signatory members use their own ownership private keys. Thus the addressee is able to verify the electronic signature using the ownership public key. That method has the drawback of being specific in application, in that it has proven to be secure only in a particular group signature scheme that corresponds to that described in the paper by J. Camenisch and M. Michels "A Group Signature Scheme With Improved Efficiency", in K. Ohta and D. Pei, editors, Advances In Cryptology—ASIACRYPT'98, Volume 1514 of LNCS, pages 160-174, Springer-Verlag, 1998. Furthermore, that method has the disadvantage that it imposes calculations on each member each time that a member joins or leaves the group; these calculations may become frequent if the dynamics of the group are particularly intense.

SUMMARY OF THE INVENTION

One objective of the invention is to remove the drawbacks of the above-described prior art methods.

To this end, the present invention provides a cryptographic method of anonymously signing a message by a member of a group comprising n members each equipped with calculation means and associated storage means. The method comprises the following initial steps at the time of constituting the group:

- a first step in which first calculation means of a trusted authority calculate a pair of asymmetric keys common to the members of the group and comprising a common public key and a common private key,
- a second step in which the first calculation means calculate a group public key associated with the group,
- a third step in which, for each member, during an interaction between the calculation means of the trusted authority and the calculation means of the member, a group private key is calculated and stored in the storage means of the member, each group private key being associated with the group public key and being different for each member of the group,
- a fourth step in which the first calculation means determine as many symmetrical secret keys as there are members of the group, and
- a fifth step in which the first calculation means encrypt the common private key using each of the secret keys to obtain as many encrypted forms of the common private key as there are non-revoked members.

The method further comprises the following steps on each revocation within the group:

- a sixth step in which the first calculation means modify the pair of common asymmetric keys to determine a common public key and a common private key that are up to date,
- a seventh step in which the first calculation means encrypt the common private key using each of the secret keys to obtain as many encrypted forms of the common private key as there are non-revoked members.

The method further comprises the following steps on the group member anonymously signing a message having to be sent to an addressee:

- an eighth step in which the common private key stored by the storage means of the member is updated only if one of the encrypted values of the common private key may be decrypted using the symmetrical secret key in the member's storage means,
- a ninth step in which the member's calculation means calculate an anonymous signature of the message using its group private key, and
- a tenth step in which the member's calculation means calculate an additional signature of the combination comprising the message and the anonymous signature using the member's common private key.

The method of the invention adds to the anonymous signature a message effected by a member with an additional signature calculated using a copy, held by the member, of a signature private key that is exactly the same for all the members authorized to sign and unknown to all revoked members. This common private key is updated by the trusted authority each time a member of the group is revoked. The copy held by a member is updated only when the member signs a message anonymously, and this updating is possible only for a non-revoked member.

Thus a revoked member is always detected because the additional signature such a member provides is necessarily false, given that said member does not have the updated common private key.

According to another feature of the invention, the group is constituted at a date t1 and the method further comprises the following operations:

- during the first step, the first calculation means associate the common private key with an update date equal to t1, and
- during the third step, the storage means of each member store the update date of the common private key, the following operation is executed at the time of each revocation within the group at a date t2:

- during the sixth step, the first calculation means modify the update date to determine an update date equal to the date t2, and the following operation is executed on each anonymous signing by the member of the group of a message having to be sent to an addressee:

- during the eighth step, the common private key stored in the member's storage means is updated only if the update date in the member's storage means is also different from the update date of the common private key updated by the first calculation means.

According to another feature of the invention, the method further comprises the following operations:

- during the third step the first calculation means calculate for each member of the group an identifier of the member and the identifier of each member is stored in the member's storage means, and the following operation on each revocation within the group:

- the first calculation means calculate an identifier for each new member of the group.

According to another feature of the invention, the steps further comprise the following operations:

during the third step, storage means connected to the first calculation means store the symmetrical secret key of each member, the pair of asymmetric keys common to the members of the group, and the group public key, and the following operation on each modification of the composition of the group that corresponds to a revocation within the group:

the secret key of the revoked member is removed from the storage means connected to the first calculation means, and the following operations to update the common private key stored in the member's storage means:

the member's calculation means read the different encrypted forms of the common private key stored in the storage means connected to the first calculation means, and the member's calculation means use the secret key in the member's storage means to decrypt the different encrypted forms of the common private key.

The invention also provides cryptographic apparatus for anonymously signing a digital message, which apparatus comprises:

first calculation means for calculating at least one pair of asymmetric keys common to the members of the group of n members and a group public key associated with the group, for calculating a group private key for each member during interaction with the member's calculation means, each group private key being associated with the group public key and being different for each member of the group, for determining as many symmetrical secret keys as there are members of the group and encrypting the common private key using each of the symmetrical secret keys to obtain as many encrypted forms of the common private key as there are non-revoked members.

According to another feature of the invention, the apparatus further comprises:

storage means connected to the first calculation means via a communications network for storing at least an symmetrical secret key of each member of the group, the group public key, the public key common to the members of the group, and each of the different encrypted forms of the common private key.

The invention further provides a smart card intended for a member of a group of n members and adapted to interact with the above apparatus. The card comprises:

means for storing a private key common to the members of the group, a group private key of the member, and a symmetrical secret key assigned to the member, means for updating the common private key stored in the member's storage means to update the common private key only if one of the encrypted values of the common private key calculated by the first calculation means of the apparatus may be decrypted using the symmetrical secret key in the member's storage means, and calculation means for calculating an anonymous signature for a message using its group private key and for calculating an additional signature for the combination comprising the message and the anonymous signature using the member's common private key.

According to another feature of the invention, the updating means of the smart card comprise decrypting means for decrypting one of the encrypted values of the common private key using the symmetrical secret key in the member's storage means. The encrypted values of the common private key are previously calculated by the first calculation means of the apparatus.

BRIEF DESCRIPTION OF THE DRAWINGS

Other features and advantages of the invention will become apparent in the course of the following description, which is given with reference to the appended drawings showing particular embodiments by way of non-limiting example. In the figures.

DETAILED DESCRIPTION OF EMBODIMENTS OF THE INVENTION

Figure 1:
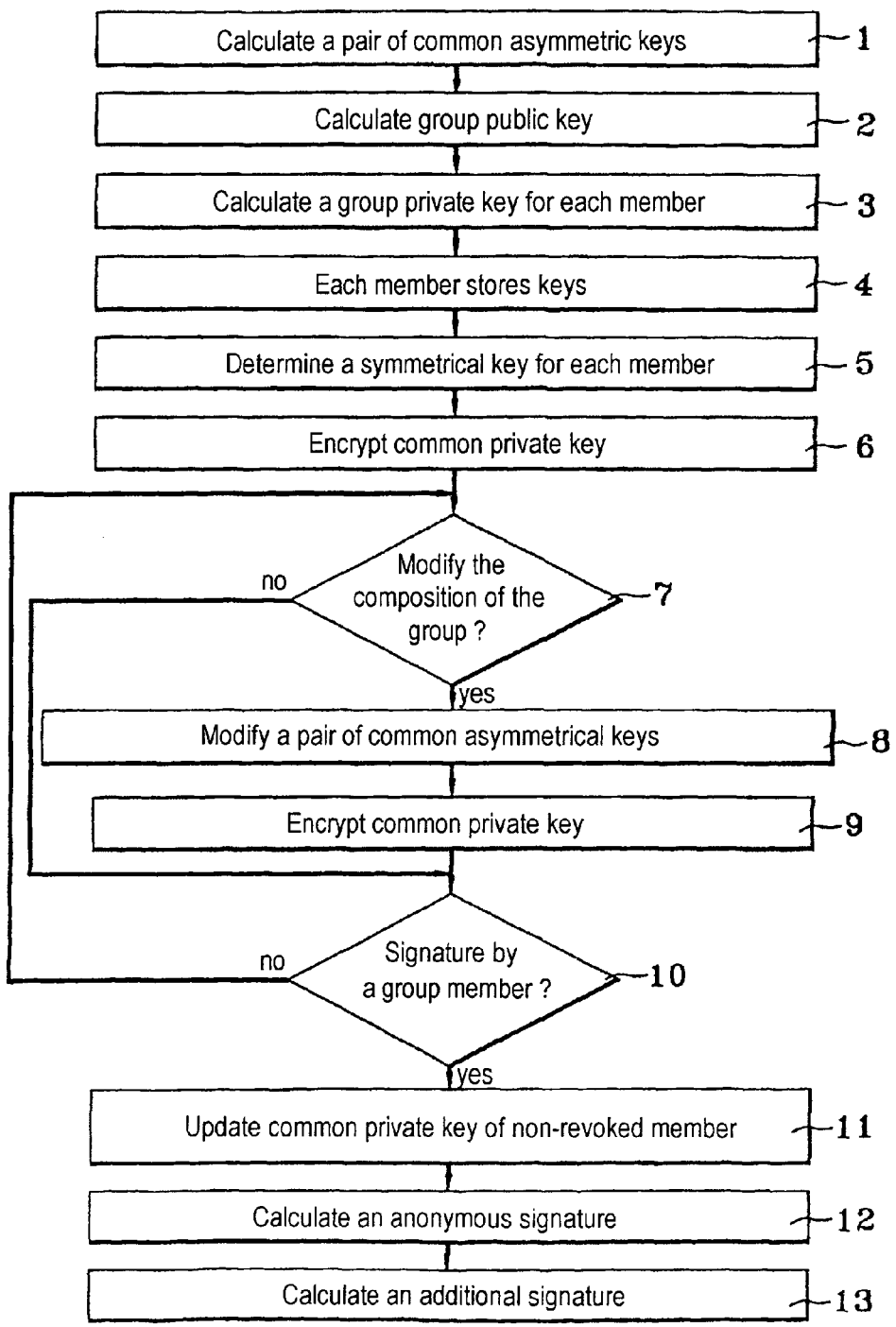
FIG. 1 is a flowchart of a method of the invention.

FIG. 1 is a flowchart of a cryptographic method of the invention for signing a message anonymously. The method is intended to be used by any member of a group comprising n members. Each member has calculation means associated with storage means. The steps of the method comprise initial steps and other steps. The initial steps are executed during the creation of the group and are described below.

A first step consists of first calculation means of a trusted authority calculating a pair of asymmetrical keys common to the members of the group (operation 1); this pair of keys comprises a common public key and a common private key. The algorithm used for the first step is a public key signature algorithm and may be an RSA algorithm, named for its authors R. L. Rivet, A. Shamir and L. Adleman.

A second step consists in the first calculation means calculating a group public key associated with the group (operation 2). The calculation is effected using a particular algorithm, which may be the one described in the paper by J. Camenisch and M. Michels "Efficient Group Signature Schemes For Large Groups", in B. Kaliski, editor, Advances In Cryptology—CRYPT097, Volume 1296 of LNCS, pages 410 to 424, Springer-Verlag, 1997.

A third step consists in calculating a group private key associated with the group public key during interaction between the trusted authority and each member of the group in turn, the group private key being different for each member of the group (operation 3). During this interaction, the group private key of the member is stored (operation 4) by the member's storage means; the trusted authority does not know this key. The calculation is effected using a particular algorithm, which may be that described in the paper by J. Camenisch and M. Michels "Efficient Group Signature Schemes For Large Groups", in B. Kaliski, editor, Advances In Cryptology—CRYPT097, Volume 1296 of LNCS, pages 410 to 424, Springer-Verlag, 1997.

A fourth step consists in the first calculation means determining as many symmetrical secret keys as there are group members (operation 5). This operation may consist in drawing digits and letters at random to form a key. In one variant, the symmetrical secret keys may conform to a particular distribution. One such distribution is described in the paper by C. K. Wong, M. G. Gouda and S. S. Lam "Secure Group Communications Using Key Graph"—Technical Report TR-97-23, 28 Jul. 1997.

A fifth step consists in the first calculation means encrypting the common private key using each of the secret keys to obtain as many encrypted forms of the common private key as there are non-revoked members (operation 6). This encryption is effected using an encryption algorithm such as the AES algorithm.

In the preceding variant, the symmetrical secret keys conform to a particular distribution that allows encryption of the common private key using only some of the secret keys.

The composition of the group may be modified after it is constituted (operation 7). One such modification is a revocation within the group or the entry of a new member into the group. The method comprises the following steps on each revocation within the group and optionally on each entry of a new member.

A sixth step consists in the first calculation means modifying the pair of common asymmetrical keys to determine a common public key and a common private key for the up to date composition of the group (operation 8). This modification is typically effected using the same algorithm as that used during the first step.

A seventh step consists in the first calculation means encrypting the common private key using each of the secret keys to obtain as many encrypted forms of the common private key as there are non-revoked members (operation 9). This encryption is typically effected using the same algorithm as that used in the fifth step.

A group member may sign a message at any time before sending it to an addressee (operation 10). The method comprises the following steps each time a message is signed anonymously by a member.

An eighth step consists in updating the common private key stored by the storage means of the member only if it is possible to decrypt one of the encrypted values of the common private key using the symmetrical secret key in the storage means of the member (operation 11). This decryption is effected using the same algorithm as that used in the seventh step, i.e. during encryption. The updating is effected if the decryption algorithm is able to decrypt one of the encrypted values of the common private key.

A ninth step consists of the calculation means associated with the member's storage means calculating an anonymous signature of the message using his group private key (operation 12). The calculation is effected using an anonymous signature algorithm. One such algorithm is described in the paper by J. Camenisch and M. Stadler "Efficient Group Signature Schemes For Large Groups", in B. Kaliski, editor, Advances In Cryptology—CRYPT097, Volume 1296 of LNCS, pages 410 to 424, Springer-Verlag, 1997. Another description is given in the paper by J. Camenisch and M. Michels "A Group Signature Scheme With Improved Efficiency", in K. Ohta and D. Pei, editors, Advances In Cryptology—ASIACRYPT'98, Volume 1514 of LNCS, pages 160-174, Springer-Verlag, 1998.

A tenth step consists in the member's calculation means calculating an additional signature of the combination of the message and the anonymous signature using the member's common private key (operation 13). The algorithm used for the tenth step is a public key signature algorithm and may be the RSA algorithm.

Figure 2:
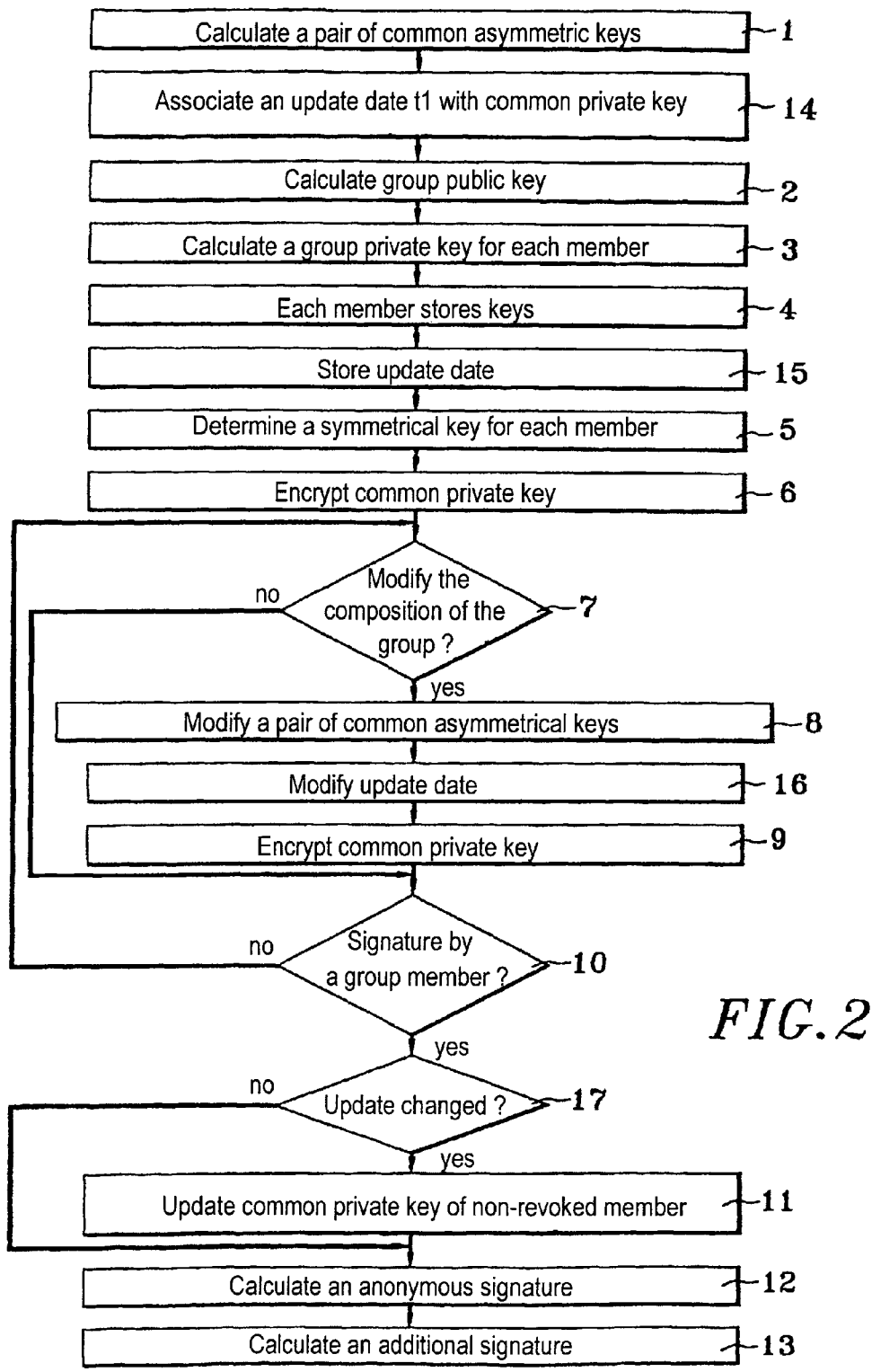
FIG. 2 is a flowchart of a particular implementation of a method of the invention.

FIG. 2 is a flowchart of one particular implementation of the method of the invention. Elements already described with reference to FIG. 1 are not described again. Specific elements are described hereinafter.

The first step further consists in associating with the common private key an update date equal to t1, where t1 is the date the group is constituted (operation 14).

The third step further consists in the storage means of each member storing the update date of the common private key (operation 15).

On each modification of the common private key at a date t2, during the sixth step, the method further consists in the first calculation means modifying the update date to determine an update date equal to the date t2 (operation 16).

On each anonymous signing by a group member of a message having to be sent to an addressee, the eighth step consists in updating the common private key in the member's storage means if the update date in the member's storage means is also different from the update date of the common private key updated by the first calculation means (operation 17). On the other hand, if the date in the member's storage means is equal to the update date of the group private key that has been updated, there is no updating by the member's storage means.

The pair of common asymmetrical keys and the update date are not updated by the first calculation means if there is no revocation of a member and no addition of a new member. Consequently, and advantageously, the member's calculation means do not update his common private key, using the common private key in the member's storage means to calculate the additional signature.

Figure 3:
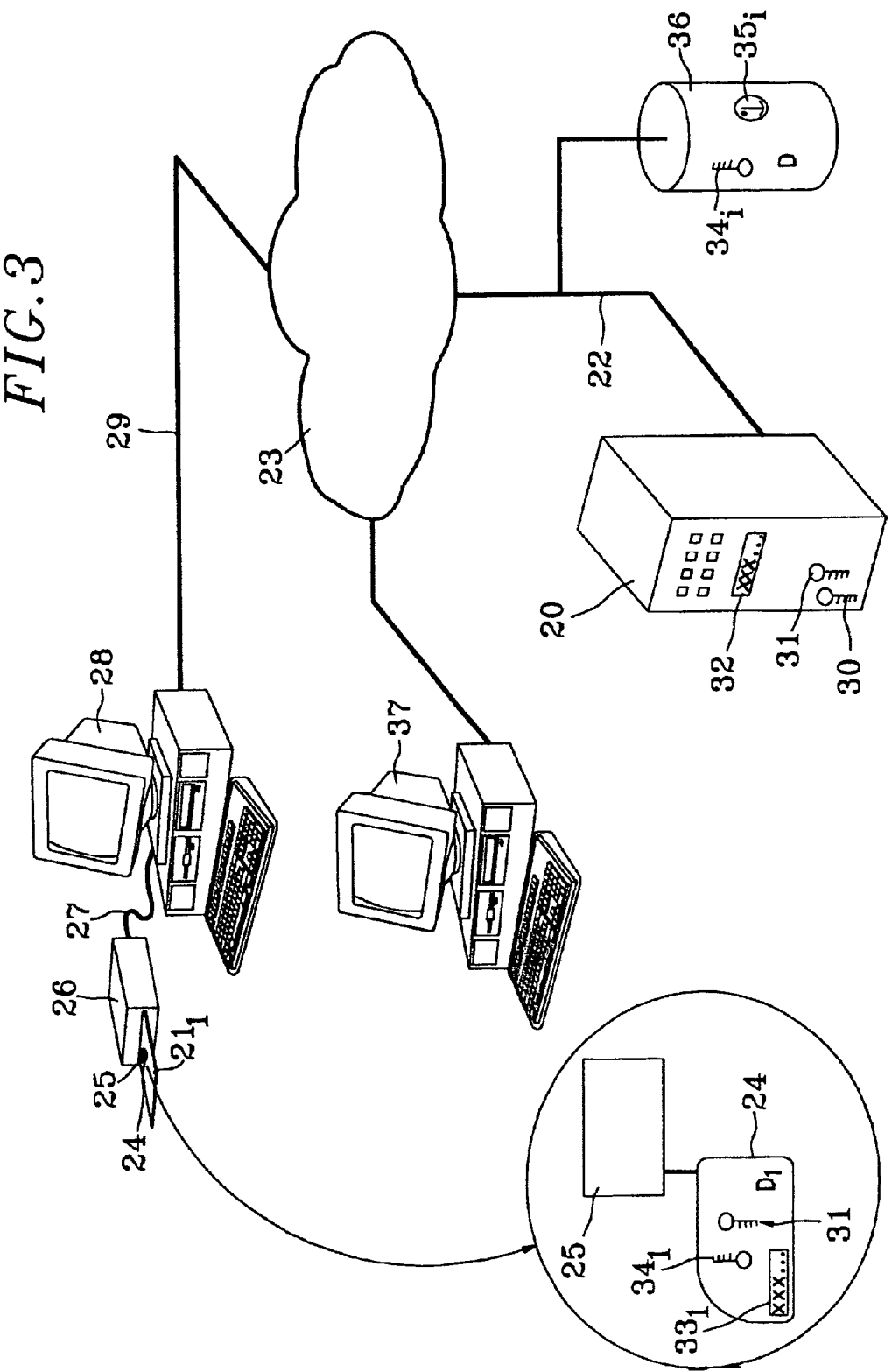
FIG. 3 is a diagram of a particular embodiment of apparatus of the invention.

FIG. 3 is a diagram of one embodiment of a system for implementing the method of the invention.

The system comprises at least calculation means 20 and as many smart cards $21_1$ as there are group members.

A trusted authority, such as a physical person, a moral person, or a national or international agency, maintains calculation means 20 that are shown in FIG. 3 in the form of a server. The calculation means 20 are connected by first communications means 22 to a communications network 23 which may be a public network such as the Internet or a private network such as a local area network (LAN).

Each member of a group holds a smart card $21_1$ whose microchip comprises storage means 24 and calculation means 25. Each member further holds or has access to a reader 26 for that card connected by a second communications link 27 to a computer, for example a personal computer 28. The personal computer 28 is connected by a third communications link 29 to the communications network 23.

The group is constituted by the trusted authority during interaction between the trusted authority and each member of the group. Before this interaction, the server 20 of the trusted authority calculates a pair of asymmetric keys 30, 31 common to the members of the group and a group public key associated with the group. During each interaction, the server 20 of the trusted authority and the calculation means 25 of the member calculate a group private key $33_1$. The group private key $33_1$ is stored in the storage means 24 of the member's smart card. After interacting with the trusted authority, the member holds a group private key that is specific to him and is different from the group private keys of all the other members. The pair of common asymmetric keys 30, 31 comprises a common public key 30 and a common private key 31. This pair 30, 31 may be associated with an update date D that is initialized to the date t1 of calculation of the pair. The group private keys are different for each member of the group and associated with the public key 32 of the group.

During each interaction, the server 20 of the trusted authority determines a symmetrical secret key $34_i$ and then encrypts the common private key 31 using each of the secret keys $34_i$ to obtain as many encrypted forms of the common private key 31 as there are non-revoked members.

During each interaction, the trusted authority's server 20 and the member's calculation means 25 generally also calculate an identifier $35_i$ of the member.

The smart card $21_1$ stores in its storage means 24 the common private key 31, the member's group private key $33_1$ and the secret key $34_1$ assigned to the member during the interaction between the trusted authority and the member. The keys are transferred into the smart card during this interaction by standard methods.

The trusted authority retains a copy of the symmetrical secret key $34_i$ and the identifier $35_i$ of each member in a memory space which may be a memory area of the server 20 or associated storage means 36. The public keys and the encrypted common private keys 31 are held in a directory stored in a public portion of the memory space 20, 36; in other words it is directly accessible via the network 23, in particular to each group member and to each addressee of a message.

After the group has been constituted by the trusted authority, it may change, on either the entry of a new member into the group or the revocation of a member of the group.

On each revocation within the group, the server 20 modifies the pair of common asymmetric keys 30, 31 to determine a pair of asymmetric keys for the up to date composition of the group. This updating is effected at a date referred to as the update date. It may also, where applicable, be effected on entry of a new member into the group.

Following the determination of this up to date pair of common asymmetric keys, the server 20 makes available in encrypted form the private key 31 of this pair of asymmetric keys for each of the smart cards $21_1$ of the non-revoked members of the group. The server 20 calculates as many encrypted forms as there are non-revoked members using the secret key $34_i$ personal to each member. Each time the group evolves, the server 20 encrypts the private key 31 of the up to date pair of common asymmetric keys 30, 31.

Each of the $34_i$ personal secret keys entered as input arguments of the encryption algorithm corresponds to a result in the form of the encrypted value of the common private key 31 of the up to date pair of asymmetric keys. The various results and, as a general rule, the update date, are stored in the directory.

When a group member wishes to sign a message stored in a personal computer 28, that member inserts a smart card 211 into the card reader 26 connected to the computer 28. The calculation means 25 of the smart card 211 connect to the memory space of the server 20 or the associated storage means 36 in which a directory is stored via the personal computer 28 and the network 23.

The smart card $21_1$ reads the update date D of the common private key in the directory. The calculation means 25 of the smart card $21_1$ compare this update date D with the date $D_1$ in its storage means 24. Either these dates are different or they are identical.

If the dates are different, the smart card $21_1$ may copy into its storage means 24 the various encrypted forms of the common private key 31, for example. The calculation means 25 of the smart card $21_1$ may then decrypt each of the encrypted forms of the common private key 31 using the decryption algorithm associated with the encryption algorithm previously used. The input arguments comprise the personal secret key $34_1$ stored in the smart card $21_1$ and the successive encrypted forms of the common private key 31. On the first correct decryption result, the smart card $21_1$ updates the common private key 31 in its storage means 24 to the decrypted value of the encrypted common private key 31 and updates the update date $D_1$ in its storage means 24 to the update date D associated with the decrypted value of the encrypted common private key 31.

Another method places an identifier of the member concerned before each encrypted form of the common private key 31. The calculation means 25 of the smart card $21_1$ can then test each encrypted form of the common private key 31 using the identifier. On reaching a valid test result, it decrypts the encrypted form of the corresponding common private key 31 using the decryption algorithm associated with the encryption algorithm previously used. The input arguments comprise the personal secret key $34_1$ stored in the smart card $21_1$ and the encrypted form of the common private key 31. The smart card $21_1$ updates the common private key 31 in its storage means 24 to the decrypted value of the encrypted common private key 31 and updates the update date $D_1$ in its storage means 24 to the update date D associated with the decrypted value of the encrypted common private key 31.

If the dates are identical, the smart card does not copy the encrypted forms of the common private key 31 into its storage means 24. This situation arises if the group has not evolved since the entry of the member into the group; the smart card $21_1$ holds the most recently updated common private key 31.

After this updating phase, the calculation means 25 of the smart card $21_1$ recover the message stored in the computer 28. The calculation means 25 of the smart card $21_1$ calculate an anonymous signature for the message using the signature algorithm. The input arguments comprise the message and the group private key $33_1$ in the memory means 24 of the microchip.

After the above calculation, the calculation means 25 of the smart card $21_1$ use the previous signature algorithm to calculate an additional signature of the combination of the message and the anonymous signature. The input arguments comprise the combination of the message and the anonymous signature and the common private key 31 in the member's storage means.

Finally, the smart card $21_1$ sends the additional signature, the anonymous signature and the message to the addressee chosen by the member.

The addressee is therefore able to verify that the member who signed the message is a non-revoked member. To this end, the addressee verifies each of the two signatures, namely the additional signature and the anonymous signature, using the common public key and the group public key, respectively. For verification purposes, the addressee uses a verification algorithm available on a personal computer 37, for example. The input arguments comprise the message and the common public key, respectively the group public key.

A first application of a method of the invention is to electronic voting, which comprises two phases:
  registration on an electoral list by an administrative authority, and
  voting using a ballot box connected via a communications network to a voting administration server.

When registering, the elector obtains a group private key by means of a method of the invention. In this embodiment of the method, the anonymous signature that the elector may produce using the group private key is referred to as "correlatable". This means that, if the elector attempts to sign a second voting slip anonymously by producing an anonymous signature, the slip is rejected by the ballot box. Because the anonymous signature is correlatable, the ballot box is able to verify that this is a second anonymous signature.

A malicious elector cannot claim that he has lost his group private key and receive another one, and thus be in a position to vote twice. A method of the invention prohibits him from using the first group private key, as this group private key is updated when he declares that he has lost the first group private key. The loss of a group private key by a member is managed by a method of the invention in the same way as revocation of the member.

A second application of a method of the invention is to electronic bidding. Bidding involves three protagonists, namely a server, a trusted authority, and a client. All clients form a client group. A user wishing to subscribe to a client group must contact the trusted authority, which supplies that user with a personal group private key. The user thus obtains the right to produce a group anonymous signature. Using this right, the user is able to sign bids anonymously. At the time of a bid for a certain product, each member of the client group may bid by signing a message containing in particular details of the product on sale and the amount of the bid. The bidding server is then able to verify that the bidder belongs to the group, and thus that the bid is valid, by verifying the group anonymous signature. The winner is the person submitting the highest bid prior to adjudication. The last message received by the bidding server is therefore that from the winner. The server then sends this message and the corresponding group anonymous signature to the trusted authority, which alone is able to remove the anonymity and thus to determine the physical identity of the purchaser of the product bid for.

Bidding involves dynamic groups as new persons may be registered with the group every day and a member may leave the group or be excluded for fraud at any time. It is therefore essential to set up a revocation mechanism to prevent a revoked member using the revoked signature fraudulently. A revoked member could continue to use the group private key to bid and thus corrupt the bidding process, for example by upping the bidding. If the revoked member is careful to withdraw from the bidding process soon enough to avoid making the winning bid, the fraud will go undetected, since only the identity of the winner is finally revealed. A method of the invention solves the problem of revocation of one or more members of the group.

A third application of a method of the invention is to electronic payment. This involves four protagonists, namely a customer, a trader, a bank, and a trusted authority. Customers must identify themselves to the system and obtain a group private key before being able to carry out a first transaction. To make a payment, the customer must withdraw electronic "cash" from his bank. Because of the use of a blind signature scheme, the cash C the customer withdraws is anonymous. The cash C is spent in the following manner: the customer generates a group signature applying to the cash C and sends the combination of the signature and the cash C to a trader. The trader verifies the signature of the bank attached to the cash C and verifies the group signature. If both signatures are valid, the trader accepts the transaction. At a given time of day, the trader sends the signatures and cash received in payment to the bank, for transfer to the trader's account. In the event of fraud, for example use of the same cash in multiple transactions, the bank sends the group signature applying to the contested cash to the trusted authority in order for it to identify and sanction the wayward customer.

A reliable mechanism for revoking group private keys that have been compromised is necessary to prevent fraud of the following type: a dishonest customer reports to the trusted authority the loss of his own group private key s and thereby absolves himself of any liability for fraud carried out using the key s. The customer hands his key over to an accomplice, who is then able to use the key s to sign cash c legitimately withdrawn from the bank and then spend the cash as many times as he wishes. A method of the invention solves the problem of revoking group private keys.

The invention claimed is:

1. A cryptographic method of anonymously signing a message by a member of a group comprising a plurality of members each equipped with calculation means and associated storage means, the method initially comprising:

a first step of calculating, at first calculation means of a trusted authority, a pair of asymmetric keys common to the members of the group and comprising a common public key and a common private key;

a second step of calculating, at the first calculation means of the trusted authority, a group public key associated with the members of the group;

a third step of calculating, during an interaction between the calculation means of the trusted authority and the calculation means of the member, a group private key for each member of the group and storing the private key in the storage means of the each member, each group private key being associated with the group public key and being different for each member of the group;

a fourth step of determining, at the first calculation means of the trusted authority, as many symmetrical secret keys as there are members of the group; and a fifth step of encrypting, at the first calculation means of the trusted authority, the common private key using each of the symmetrical secret keys to obtain as many encrypted forms of the common private key as there are non-revoked members;

on each revocation of a member from the group, the method further comprising:

a sixth step of modifying, at the first calculation means of the trusted authority, the pair of asymmetric keys common to the group to create an up-to-date common public key and an up-to-date common private key;

a seventh step of encrypting, at the first calculation means of the trusted authority, the up-to-date common private key using each of the symmetrical secret keys to obtain as many encrypted forms of the up-to-date common private key as there are non-revoked members; and when a non-revoked group member anonymously signs a message to be sent to an addressee, the method further comprising:

an eighth step of updating the common private key stored in the storage means of the signing member only if one encrypted value of the up-to-date common private key may be decrypted using the symmetrical secret key stored in the storage means of the signing member;

a ninth step of calculating, at the calculation means of the signing member, an anonymous signature of the message using the group private key for the signing member; and a tenth step of calculating, at the calculation means of the signing member, an additional signature of a combination comprising the message and the anonymous signature using the up-to-date common private key of the signing member;

wherein the group is constituted at a date t1 and the method further comprises:

during the first step associating, at the first calculation means, the common private key with an updated date equal to t1; and during the third step storing, at the storage means of each member, the updated date of the common private key;

wherein at the time of each revocation within the group at a date t2:

during the sixth step modifying, at the first calculation means of the trusted authority, the updated date to determine an updated date equal to the date t2; and wherein on each anonymous signing by the member of the group of the message to be sent to the addressee:

during the eighth step, the common private key stored in the storage means of the signing member is updated only if the updated date in the storage means of the signing member is also different from the updated date of the up-to-date common private key updated by the first calculation mean.

2. A cryptographic of anonymously signing a message by a member of a group comprising a plurality of members each equipped with calculation means and associated storage means, the method initially comprising:

a first step of calculating, at first calculation means of a trusted authority, a pair of asymmetric keys common to the members of the group and comprising a common public key and a common private key;

a second step of calculating, at the first calculation means of the trusted authority, a group public key associated with the members of the group;

a third step of calculating, during an interaction between the calculation means of the trusted authority and the calculation means of the member, a group private key for each member of the group and storing the private key in the storage means of the each member, each group private key being associated with the group public key and being different for each member of the group;

a fourth step of determining, at the first calculation means of the trusted authority, as many symmetrical secret keys as there are members of the group; and a fifth step of encrypting, at the first calculation means of the trusted authority, the common private key using each of the symmetrical secret keys to obtain as many encrypted forms of the common private key as there are non-revoked members;

on each revocation of a member from the group, the method further comprising:

a sixth step of modifying, at the first calculation means of the trusted authority, the pair of asymmetric keys common to the group to create an up-to-date common public key and an up-to-date common private key;

a seventh step of encrypting, at the first calculation means of the trusted authority, the up-to-date common private key using each of the symmetrical secret keys to obtain as many encrypted forms of the up-to-date common private key as there are non-revoked members; and when a non-revoked group member anonymously signs a message to be sent to an addressee, the method further comprising:

an eighth step of updating the common private key stored in the storage means of the signing member only if one encrypted value of the up-to-date common private key may be decrypted using the symmetrical secret key stored in the storage means of the signing member;

a ninth step of calculating, at the calculation means of the signing member, an anonymous signature of the message using the group private key for the signing member; and a tenth step of calculating, at the calculation means of the signing member, an additional signature of a combination comprising the message and the anonymous signature using the up-to-date common private key of the signing wherein the method further comprising member;

during the third step calculating, at the first calculation means, an identifier of the member for each member of the group and storing the identifier of the each member of the group in the storage means of each member; and calculating, at the first calculation means of the trusted authority an identifier for each new member of the group on each revocation within the group.

3. The cryptographic method according to claim 2, further comprising:

during the third step storing, at storage means connected to the first calculation means of the trusted authority, the symmetrical secret key of each member, the group public key, the public key common to the members of the group, each of the encrypted forms of the common private key, and each of the identifiers, each encrypted form of the common private key being associated with one of the identifiers; and for each modification of the composition of the group that corresponds to a revocation of one of the members of the group, the method further comprising:

removing the secret key of that member from the storage means connected to the first calculation means of the trusted authority; and to update the common private key stored in the storage means of the member, the method further comprising:

reading, at the calculation means of the member, the encrypted form of the common private key stored in the storage means connected to the first calculation means of the trusted authority and associated with the identifier of the member; and decrypting, at the calculation means of the member, the encrypted form of the common private key previously read using the secret key stored in the storage means of the member.

4. The A cryptographic method of anonymously signing a message by a member of a group comprising a plurality of members each equipped with calculation means and associated storage means, the method initially comprising:

a first step of calculating, at first calculation means of a trusted authority, a pair of asymmetric keys common to the members of the group and comprising a common public key and a common private key;

a second step of calculating, at the first calculation means of the trusted authority, a group public key associated with the members of the group;

a third step of calculating, during an interaction between the calculation means of the trusted authority and the calculation means of the member, a group private key for each member of the group and storing the private key in the storage means of the each member, each group private key being associated with the group public key and being different for each member of the group;

a fourth step of determining, at the first calculation means of the trusted authority, as many symmetrical secret keys as there are members of the group; and a fifth step of encrypting, at the first calculation means of the trusted authority, the common private key using each of the symmetrical secret keys to obtain as many encrypted forms of the common private key as there are non-revoked members;

on each revocation of a member from the group, the method further comprising:

a sixth step of modifying, at the first calculation means of the trusted authority, the pair of asymmetric keys common to the group to create an up-to-date common public key and an up-to-date common private key;

a seventh step of encrypting, at the first calculation means of the trusted authority, the up-to-date common private key using each of the symmetrical secret keys to obtain as many encrypted forms of the up-to-date common private key as there are non-revoked members; and when a non-revoked group member anonymously signs a message to be sent to an addressee, the method further comprising:

an eighth step of updating the common private key stored in the storage means of the signing member only if one encrypted value of the up-to-date common private key may be decrypted using the symmetrical secret key stored in the storage means of the signing member;

a ninth step of calculating, at the calculation means of the signing member, an anonymous signature of the message using the group private key for the signing member; and a tenth step of calculating, at the calculation means of the signing member, an additional signature of a combination comprising the message and the anonymous signature using the up-to-date common private key of the signing member;

wherein the method further comprising:

during the third step storing, at storage means connected to the first calculation means of the trusted authority, the secret key of each member, the pair of asymmetric keys common to the members of the group, and the group public key; and on each modification of the composition of the group that corresponds to a revocation within the group:

eliminating the secret key of a revoked member from the storage means connected to the first calculation means of the trusted authority; and to update the common private key in the storage means of the member, the method further comprising:

reading, at the calculation means of the member the encrypted forms of the common private key in the storage means connected to the first calculation means of the trusted authority; and using, at the calculation means of the member, the secret key in the storage means of the member to decrypt the encrypted forms of the common private key.

* * * * *